Sept. 9, 1941.   R. J. ROCKWELL   2,255,299

DIRECT-CURRENT VOLTAGE TRANSFORMATION

Filed July 7, 1933

INVENTOR.
Ronald J. Rockwell
BY Allen & Allen
ATTORNEYS

Patented Sept. 9, 1941

2,255,299

UNITED STATES PATENT OFFICE 2,255,299

DIRECT-CURRENT VOLTAGE TRANSFORMATION

Ronald J. Rockwell, Cincinnati, Ohio, assignor to The Crosley Corporation, Cincinnati, Ohio, a corporation of Ohio Application July 7, 1933, Serial No. 679,434

7 Claims. (Cl. 171—97)

My invention relates to mechanical devices for interrupting or otherwise modifying the primary current of a voltage-change device and for rectifying the secondary current thereof. While it will be understood that my invention is by no means confined thereto, for the purpose of making a clear disclosure of my invention in an illustrative and exemplary embodiment, I shall describe it in connection with means for producing a relatively high voltage direct current from a relatively low voltage direct current source, such as finds utility in providing the socalled B current for radio sets. The earliest radio sets for use in automobiles required the use of B batteries which were found to be inconvenient. It was then proposed to produce the relatively high-voltage B current from the low-voltage A source, or storage battery of the car, and to this end a high-ratio transformer was provided and its primary current, which was the 6-volt current from the storage battery, was passed through an interrupter, usually of the mechanical vibrating reed type. The secondary or high voltage current, which was of course alternating in form, was then rectified by means of a rectifying tube or tubes usually containing mercury vapor. Electronic tubes are less efficient and also have other disadvantages in the particular use.

The tubes were a source of great trouble under the relatively severe conditions of use in automobiles. A decrease in external temperatures caused the mercury in the tube to fail to vaporize, sometimes for considerable periods of time, under which circumstances the tube acted as an electronic rectifier with a rapid destruction of its elements. So serious has this difficulty been that in many installations, motor generators, operating from the storage battery, have been used to deliver the high voltage B current at obviously greater expense for equipment. Both the motor generators and the tubes are also somewhat lacking in overall efficiency. It will be understood that whether electronic or mercury tubes are used, the filament current is a source of power loss.

Hitherto no satisfactory suggestion has been made to eliminate the tube in the transformer source of high voltage current. This is primarily for the reason that a separate mechanical rectifier applied to the secondary current is an additional source of power loss; and to endeavor to use one vibrating means for both the interrupting of the primary current and the rectification of the secondary, encounters the fundamental difficulty that the fluctuations of the secondary voltage are not suitable for rectification simultaneously with the interruptions of the primary current. Thus such elements either do not operate at all; or the device operates at extremely low efficiency because it cannot rectify the entire half wave and destructive sparking occurs.

The general objects of my invention, as well as the specific objects which relate to the exemplary embodiment referred to, will be clear to one skilled in the art from the description which follows. Reference is now made to the drawing, wherein.

Figure 2:
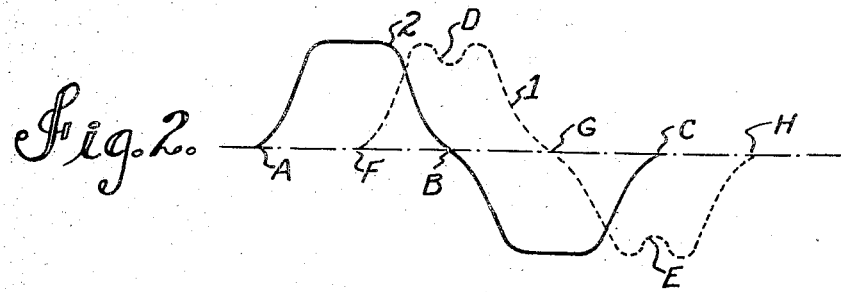
Fig. 2 shows the lagging of the voltage wave of the secondary behind the flux wave.

A reference to Fig. 2 will show how the secondary voltage wave 1 may be out of step by a quarter of a cycle with the flux wave 2. The flux has been shown as varying from a positive to a negative value, which presupposes an arrangement of the primary coil and interrupter contacts, such that the energizing current is actually reversed. This may be accomplished of course by providing a center tap in the primary transformer winding, connecting this center tap with one pole of the source of primary supply current, connecting the other pole of the source of primary supply current to the reed of the vibrator, and providing on either side of the vibrating reed, contacts connected respectively to the end taps of the primary windings. It may also be accomplished by a reversal switch, or other well known means. By mounting the last mentioned contacts upon spring members which can follow the vibrating reed, the time interval between the opening of one contact and the closing of the other can be made very short, and the time during which the contacts are closed may be proportionately lengthened. The curve marked 2 therefore becomes a fair representation of the flux changes. The times of the actual interruptions of the current are represented upon the chart in Fig. 2 at a, b and c. It will be noted that these times coincide with intervals marked d and e, at which the secondary voltage is at its maximum, whether of a positive or negative value. To attempt rectification of the secondary voltage at the points d and e will obviously be useless, and while some rectification effect may be secured by changing the contacts of a mechanical rectifier for the secondary current at the points d and e if the contacts are held closed for a substantial period thereafter, yet it will be obvious that such a system would be highly inefficient, and that only a relatively small portion of the secondary current would be realized in the rectified output. For the highest efficiency the secondary terminals should be reversed at the point of change between positive and negative secondary voltage values, or at the points f, g and h, which points, it will be noted, occur at the points of minimum flux change, i. e. at the peaks of the wave form illustrated by the flux curve 2.

Figure 3:
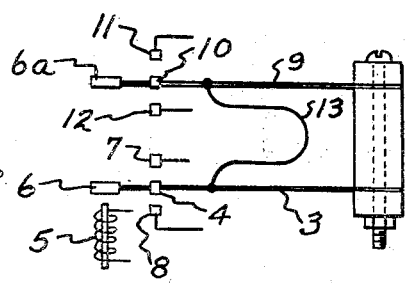
Fig. 3 is a diagrammatic showing of a device whereby the difference in phase relationship may be compensated for by mechanical vibrators which are connected together so as to vibrate one with respect to the other with the interposition of a time interval, though each vibrating element is driven either directly or indirectly by the same motive means.

One way in which my invention may be practiced is illustrated diagrammatically in Fig. 3, where a reed 3 bearing a contact member 4 is mounted upon a suitable support for vibration as actuated by magnetic means indicated generally at 5. 6 represents an armature on the reed 3. The reed may be electrically connected with one side of the source of the primary current, and the contacts 7 and 8 may be connected to the outer taps of the primary coil of the transformer. In this modification of my invention I provide a second vibrating member 9 mounted upon a suitable support and bearing contact members 10. This vibrating member may be connected with one of the power output terminals, the other power output terminal being connected with a center tap in the secondary winding of the transformer. Co-operating contact members 11 and 12 are connected with the end terminals of the secondary winding of the transformer.

If the member 9 can be made to vibrate with the same periodicy as the member 3, but out of step therewith by a quarter of a cycle, the optimum conditions as described above may be realized. This I accomplish by tying the vibrating reed 3 to the vibrating member 9 by mechanical means which have a delayed action. I have shown for this purpose a bent spring member 13 which may be of wire, or of thin sheet metal, and may have the shape shown or some other shape suitable for the purpose. In the operation of the device, as the reed 3 is driven in either direction, the spring member at first takes up the impulse, and then, after an appreciable time interval, the impulse is transferred through the resiliency of the spring member to the member 9, which then is driven in the same direction. The member 9 will therefore be driven at the same frequency as the member 3, but out of step therewith, and the degree of the out of step relationship between the members 3 and 9 may be controlled by varying the resilience, shape and disposition of the member 13, as well as the points of attachment to the vibrating members. A mass 6a may be employed to give the reed 9 the same vibrating period as the reed 3. The reed 3, together with its armature and magnet 5 and 6, thus forms a single prime mover for the entire device, and highly efficient rectification is secured.

In another aspect of my invention I provide means for controlling the secondary voltage until it is in such relationship to the flux that it may be rectified simultaneously with the interruptions of the primary current. If this is done, then it is not necessary to provide for a mechanical out-of-step relationship between the interrupter for the primary current, and a rectifier for the secondary voltage. Under such circumstances I may employ a single vibrating element to accomplish both functions, providing this element with sufficient contacts for the purpose.

Figure 1:
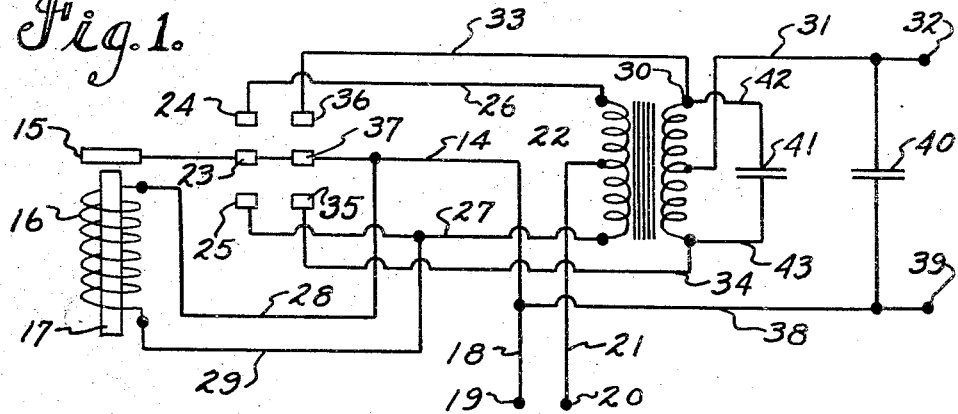
Figure 1 shows an arrangement of my invention in which the fluctuations of the secondary voltage are so modified as to bring them in proper condition for rectification by means which act simultaneously with the means for interrupting the primary current.

A system of this kind is shown in Fig. 1, wherein a vibrating reed 14 is provided with an armature 15 arranged to be actuated by a magnet 16, having a coil 17. The reed itself is connected by means of a lead 18 to an input terminal 19. The other input terminal 20 is connected by means of a lead 21 to the center tap of the primary winding 22 of a transformer. The reed bears contact members 23; and co-operative contact members 24 and 25 are provided, connected respectively by leads 26 and 27 to the end terminals of the primary winding of the transformer. The magnet coil 17 may be connected as shown by leads 28 and 29, to one of the input terminals and to one of the end terminals of the transformer. The effect of this, as shown in Fig. 1, is to apply power to the coil 17 so long as contacts 23 and 25 are open. This draws the reed downwardly in the figure. When the contacts 23 and 25 are closed, the coil 17 is short circuited thereby, and the pull on the armature 15 is released. The coil 17, of course, may be otherwise connected into the circuit, or may be separately actuated.

As to the secondary circuit, the secondary winding 30 of the transformer has its center tap connected by means of a lead 31 to an output terminal 32. Its end taps are connected respectively by leads 33 and 34 to contact members 35 and 36 located adjacent the reed. The reed bears cooperating contact members 37. The reed itself is likewise connected by means of a lead 38 to the other secondary output terminal 39. I have shown in Fig. 1 a filtering condenser 40, connected across the output terminals. This filtering condenser forms no essential part of my present invention. It will be obvious that a suitable filter system comprising at least one series inductance, and usually several shunt capacities, will be employed to smooth out the voltage fluctuations of the secondary current. In the particular installation of my exemplary embodiment the filter condenser 40 is included in the so-called B supply unit, whereas the inductance and another capacity form a part of the radio set itself.

It will be clear that the system merely as so far described would work extremely inefficiently if at all, by reason of the uncontrolled relationship between the secondary voltage and the interruption periods of the primary current. To correct this I provide means for modifying this phase relationship by controlling the secondary voltage. I accomplish this by shunting across the secondary winding 30 a capacity 41 connected to the end terminals of the winding by leads 42 and 43. When this is done, if the value of the capacity 41 is correctly chosen, the periods of make and break for the secondary rectifying circuit, as determined by the movements of the single reed 14, will coincide with the zero voltage periods of the secondary current, and also the points of maximum flux change in the transformer.

A very pretty demonstration of this may be accomplished by means of a neon tube which is arranged so that the action of the vibrating mechanism can be viewed by its light. If the neon tube, for example, be connected in either of the leads 33 or 34 and the system set in motion, either the lower or upper contacts will appear closed. If the tube is connected across the secondary winding 30, and if the capacity 41 is of the proper value, and if the tube is placed behind the vibrating reed, either set of contacts will appear to be closed, depending upon which anode of the tube is illuminated; or if the tube is of the type in which adjacent plates are alternately illuminated by the glow discharge, the reed 14 will appear to be split at the interspace between the plates. If the tube be placed in series with the capacity 41, both sets of contacts will appear open. If this capacity is made variable, then by adjusting it, the vibrating reed may be caused apparently to assume any desired position between the upper and lower contacts, thus showing the change in phase relationship between the transformer flux and the secondary voltage, which is brought about by the insertion and adjustment of the capacity 41. With any given transformer this method may be used to determine the necessary and proper value of the controlling capacity.

My invention marks a radical step forward in the production of inexpensive devices for furnishing relatively high voltage current from relatively low voltage direct current sources. Its rectification characteristics are excellent, and its overall efficiency is high. Excepting for power losses incident to the circuit, the only additional power absorbed by the system is that required to energize the magnet coil 46 in Figs. 4 and 5, or 17 in Fig. 1.

The electrical control may also be applied to the primary circuit. I may also employ my mechanical lag device in connection with electrical control means.

While I have described my invention in connection with a circuit employing a center tapped transformer, it will be understood, of course, that it is applicable to other types of transformers. The utility of my invention is not confined to the specific embodiments which I have herein described, but is, of course, applicable to other devices presenting similar problems; and the degree of voltage change between the primary and secondary current, and whether this change be an increase or decrease in the voltage of the secondary with respect to the voltage of the primary, are not limitations upon my invention. The system can be operated as a half wave device either as respects the primary or secondary or both, although the efficiency will be somewhat less. It will also be clear that I can employ mechanism and a system in which both mechanical and electrical lag are produced and employed.

In this application I am claiming means for securing a time lag or phasing in the rectifying and interrupting mechanism. Electrical means are claimed in my copending application which has matured into Patent No. 1,920,150, issued July 25, 1933, reissued as No. 18,971, on Oct. 24, 1933.

In the claims that follow, it will be understood that by the term "interrupting" I mean to include reversal of the primary current when and if that takes place.

Having thus described my invention, what I claim as new and desire to secure by Letters Patent, is:

1. In combination with a voltage change device, vibrating means having a single motive means, said vibrating means comprising at least two vibrating elements with contacts, one of said elements arranged to interrupt a primary current and the other of said elements arranged to rectify a secondary current, and a mechanical transmission between said vibrating means, having a time delay action.

2. In combination with a voltage change device, a single motive means, and means associated therewith for interrupting a primary current and for rectifying a secondary voltage at a desired potential value of said secondary voltage, said means being mechanically phased to accomplish said result.

3. In combination with a voltage change device, having a series of contacts to interrupt a primary current and a series of contacts to rectify a secondary current, and mechanical means for causing said last mentioned series of contacts to operate in phase with a desired recurring value of said secondary current.

4. In combination with a voltage change device, vibrating means for interrupting a primary current, vibrating means for rectifying a secondary voltage, and mechanical means for phasing said vibrating means substantially in quadrature.

5. In combination with a voltage change device, vibrating means for interrupting a primary current, vibrating means for rectifying a secondary voltage, means for driving at least one of said vibrating means, and mechanical means for phasing the operation of said several vibrating means substantially in quadrature.

6. In combination with a voltage change device, vibrating means for producing fluctuations in a primary current, means for rectifying a secondary voltage, means for driving at least one of said means, and a mechanical connection between said means such as to cause said secondary voltage to be rectified at a desired potential thereof, as determined by the fluctuations by said first mentioned means.

7. In combination with a voltage change device, a vibratory reed having contacts for interrupting a primary current for said voltage change device, means for driving said reed, a second reed having contacts for rectifying the secondary voltage, and means for driving said second reed at a periodicity similar to the periodicity of the first reed, but substantially out of phase therewith.

RONALD J. ROCKWELL.